May 18, 1937.   P. COSCIA   2,081,001
ICE MILLING MACHINE
Filed Aug. 13, 1936   2 Sheets-Sheet 1
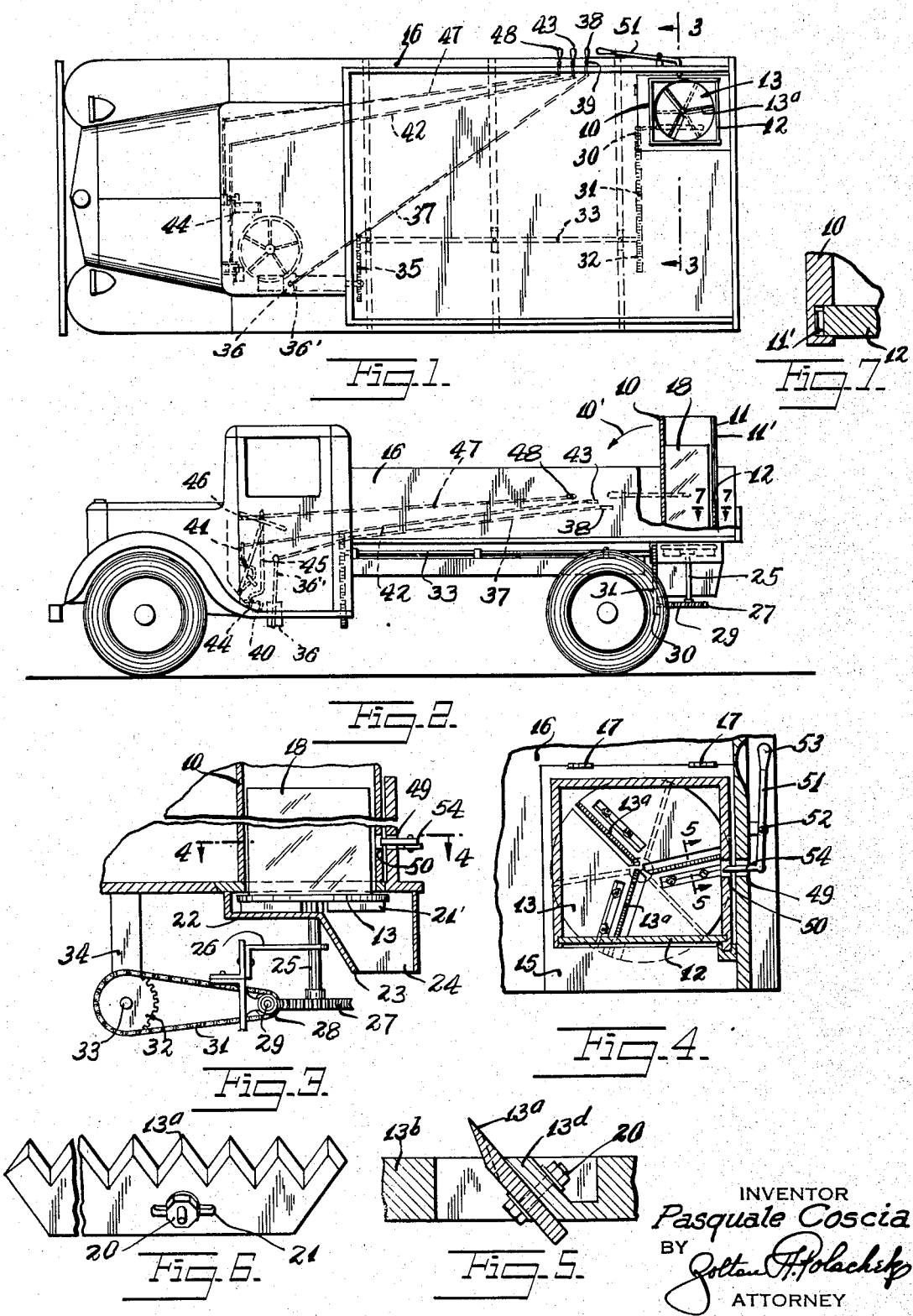

May 18, 1937. P. COSCIA 2,081,001

ICE MILLING MACHINE

Filed Aug. 13, 1936 2 Sheets-Sheet 2

INVENTOR
Pasquale Coscia
BY
Zoltan H. Polachek
ATTORNEY

Patented May 18, 1937

2,081,001

UNITED STATES PATENT OFFICE 2,081,001

ICE MILLING MACHINE

Pasquale Coscia, New York, N. Y.

Application August 13, 1936, Serial No. 95,733

5 Claims. (Cl. 83—62)

This invention relates to new and useful improvements in an ice milling machine.

The invention has for an object the construction of a device as mentioned which is adapted to be associated with an ice truck and to be operated by the driving mechanism of the truck.

More specifically, the invention contemplates characterizing the milling machine by a chute adapted to receive a cake of ice and a disc cutter coaxial with the chute and extending transversely across the bottom thereof and having radial cutting elements starting at the center and extending outwards. With this construction the cake of ice will be cut completely and the formation of a core at the center of the cutter eliminated. Such core formation is highly objectionable since the cake of ice then cannot freely rest upon the cutter.

A still further object of the invention resides in the provision of a mechanism for clamping and holding a cake of ice within the chute so that the milling operation may cease even though the milling machine is turning over.

Another one of the objects of this invention resides in the provision of a control arranged adjacent the said chute and by which the milling machine may be set into operation and rendered inoperative, as desired.

Still further the invention proposes an arrangement whereby the chute is hingedly mounted so that it may be hinged backwards and rested upon the bottom of the truck in an inoperative position.

Still further the invention proposes the provision of a pneumatic device associated with the discharge of the milling machine for pneumatically conveying the milled ice into a sack arranged upon the truck.

Another one of the objects of this invention is to provide radial baffles upon the bottom face of the disc cutter co-acting with a bottom casing enclosing the disc cutter and arranged to discharge the milled ice through a chute.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of a truck with an ice milling machine constructed according to this invention.

Fig. 2 is a side elevational view of the disc shown in Fig. 1 with a portion thereof broken away to disclose back parts.

Fig. 3 is a fragmentary sectional view taken on the line 3—3 of Fig. 1.

Fig. 4 is a horizontal sectional view taken on the line 4—4 of Fig. 3.

Fig. 5 is a fragmentary enlarged sectional view taken on the line 5—5 of Fig. 4.

Fig. 6 is an elevational view of the blade shown in Fig. 5.

Fig. 7 is a fragmentary horizontal sectional view taken on the line 7—7 of Fig. 2.

Figure 8:
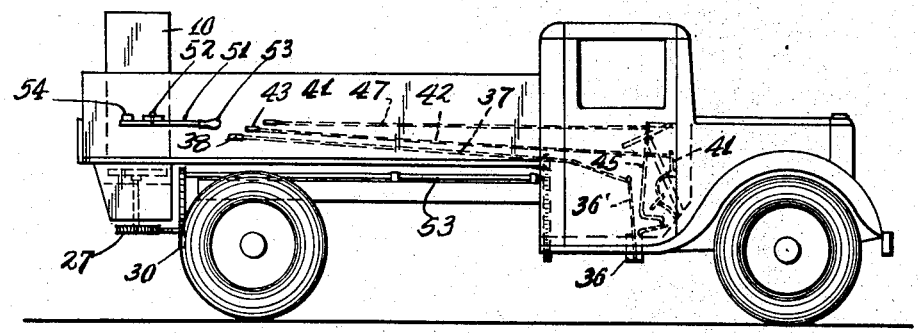
Fig. 8 is an elevational view of the back side of the truck shown in Fig. 2.

The ice milling machine, according to this invention, comprises a chute 10 formed with an open rear side 11 and adapted to receive a cake of ice. A slide 12 is associated with track grooves 11' along the rear edge of the chute and is adapted for closing this open rear side of the chute to hold the cake of ice in position. A disc cutter 13 is arranged coaxially with the chute and transversely across the bottom thereof and is formed with a plurality of radial cutting elements 13ª starting at the center. A means is provided for rotating the disc cutter 13. A means is also provided for holding a cake of ice from moving downwards in the chute when so desired.

The chute 10 is mounted upon a frame member 15 which rests upon the bottom of a truck body 16. This frame 15 is connected at its front end by hinges 17 with the truck body so that the chute 10 may be pivoted frontwards as indicated by the arrow 10' in Fig. 2. The slide 12 is of short height, relative to the cake of ice 18 which may be placed within the chute 10, and this small slide will be sufficient to hold the cake of ice in position. This slide 12 may be moved upwards to the top of the chute so that the cake of ice may be engaged into the chute from the open rear side. Another way of engaging the cake of ice into the chute would be to pivot the chute frontwards, as indicated by the arrow 10', so that it is lying on its side upon the bottom of the truck 17, and sliding a cake of ice endwise into the chute. The chute and the cake of ice may then be lifted to the vertical operative position.

The disc cutter 13 comprises a disc 13b formed with several radial openings 13c adjacent which there are flange portions 13d. The cutting elements 13a are reversible and interchangeable with cutting elements of different cutting edges and are engaged through the openings 13c and secured in position by bolts and nuts 20 which engage through the flange portions 13d and through slots 21 formed in the cutting elements 13a. The purpose of these slots is to permit the cutting elements to be adjusted radially into positions in which their inner ends align with the axis of the cutter. It is thus possible to cut the cake of ice without permitting a core portion to remain. If a core portion does remain the milling operation cannot be so rapid, since sufficient time must pass for the core portion to break off, or melt, before other portions of the ice may engage against the disc cutter. In the form of the disc cutter shown in Fig. 4 there are three equally spaced radial openings 13c in which there are located three cutting elements 13a. More or less openings and cutting elements may be used as hereinafter further described.

There are several baffles 21' radially mounted upon the bottom of the disc 13b, and preferably straddling the openings 13c. There is a casing 22 mounted upon the underside of the truck and partially encasing the disc cutter 13 and terminating at one side in a baffle 23. The baffles 21' are adapted to scoop the milled ice and discharge it down over the baffle 23 and through the opening 24. A bag or pail for collecting the milled ice may be placed beneath the opening 24.

The means for rotating the disc cutter 13 comprises a shaft 25 which is connected with the cutter and which is rotatively supported by standards 26. A worm gear 27 is mounted on the shaft 25 and meshes with a worm 28 supported upon the standards 26. This worm 28 is upon a shaft 29 carrying a pinion 30 engaged by a chain 31 also engaging over a gear 32. This gear 32 is fixed on a shaft 33 which is rotatively mounted in standards 34 and extends to the front of the truck. At the front the shaft 33 connects with a gear reduction mechanism 35 indirectly connected with the motor of the truck by a clutch 36. This clutch is provided with an operating handle 36' by which it may be engaged and disengaged as desired.

A rod or cable 37 connects with the clutch handle 36' at one end and at the other end with a lever 38 pivotally mounted intermediately by a pintle 39. This lever 38 is disposed adjacent the chute 10 and may be operated to engage or disengage the clutch. The conventional clutch pedal 40 of the motor vehicle may also be operated from the rear of the vehicle by a bell crank 41 which is pivotally mounted and which connects with a rod or cable 42 extending to a pivotally mounted lever 43 in the vicinity of the lever 38. The conventional gas accelerator 44 of the truck is engaged by a lever 45 which is pivotally mounted on a bracket 46. This lever 45 connects with a rod or cable 47 connected at another portion with a lever 48 arranged in the vicinity of the levers 38 and 43.

Upon the side of the truck there is an opening 49 which aligns with a corresponding opening 50 in the side of the chute 10. A lever 51 is pivotally mounted upon a bracket 52 intermediate of its ends and at one end is formed with a handle portion 53. The other end connects with a pin 54 extending through the openings 49 and 50 and adapted to engage against a cake of ice within the chute and force the ice against the opposed wall of the chute and so lock and hold the ice in fixed position.

Figure 9:
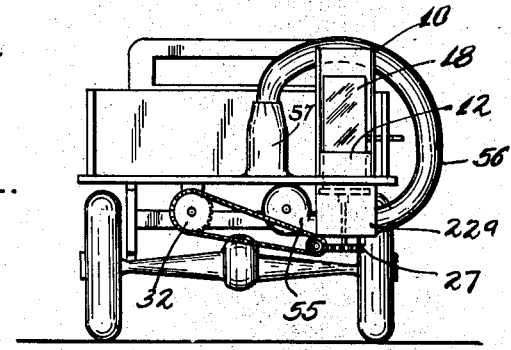
Fig. 9 is an elevational view of the rear end of the truck provided with an ice milling machine constructed according to a modification of the invention.

In Fig. 9 a modified form of the invention has been disclosed in which there is a closed casing 22a engaged over the bottom of the disc cutter. A blower 55 is mounted upon the truck and discharges into one side of the casing 22a and is capable of pneumatically conveying the milled ice out through a pipe system 56 on the other side of the casing 22a. This pipe system extends around and over one side of the truck. A bag 57 for collecting ice is adapted to be engaged upon the end of the pipe 56.

Figure 10:
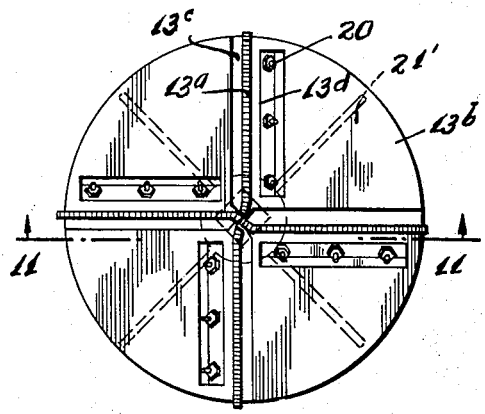
Fig. 10 is a plan view of a disc miller for use in the milling machine and constructed according to a modification of the invention.
Figure 11:
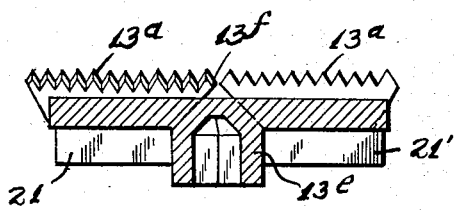
Fig. 11 is a sectional view taken on the line 11—11 of Fig. 10.

In Figs. 10 and 11 a modified form of disc cutter has been disclosed which is substantially identical to the form previously shown and described except for the number of cutting elements. In this form of the invention there is a disc 13b formed with four radial openings 13c arranged at right angles and in which the cutting elements 13a are disposed. These cutting elements are secured upon flanges 13d by bolts 20. Radial baffles 21' are arranged on the bottom of the disc 13b and straddle the openings 13. The disc 13b has a hub portion 13e binding together the various sections between the radial openings 13c. At the top of the hub portion 13e there is a conical portion 13f against which the inner ends of the radial cutting elements 13a may engage.

Figure 12:
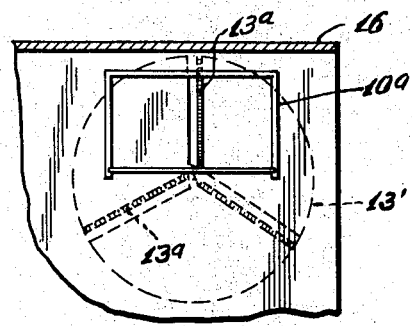
Fig. 12 is a fragmentary plan view of an ice milling machine embodying another form of the invention.

In Fig. 12 there is another modified form of the invention in which there is a chute 10a of greater width than that shown in Fig. 1 and which is capable of holding a full sized cake of ice. In the form previously described it is necessary that the cake of ice be split in half. In the form of the invention shown in Fig. 12 the disc cutter 13' is sufficiently large to engage across the entire cake of ice within the chute 10a. In other respects this form of the invention is identical to the previous forms and the same parts may be recognized by the corresponding numerals.

The operation of the device is as follows: A cake of ice 18 is placed within the chute 10. The lever 43 is moved so that the clutch pedal 40 is pressed in and the conventional transmission clutch of the vehicle is disengaged. Then the lever 38 is moved to move the handle 36' and engage the clutch 36. Rotations will be transmitted through the gears 35, the shaft 33, etc., to rotate the disc 13. If it is desired to speed up the rotation, the lever 48 may be moved to cause depression of the gas pedal 44. When thus operated the cake of ice may be milled in a very short period of time.

If after a certain amount of the ice has been collected and it is desired to delay further milling for a short while, it is merely necessary to move the lever 51 so that the pin 54 engages against the side of the cake of ice and locks the cake of ice against the side of the chute. As the ice cannot now move downwards the milling operation will cease even though all of the milling parts are operating.

It is to be understood that my milling device may also be driven by an independent motor instead of the transmission of the vehicle, also that a suitable weight may be placed on top of the ice when the cake of ice becomes small and diminishes so that its weight will not be sufficient to feed it against the rotary cutter. The rotary cutter may also be made rotatable in the vertical plane and the cake of ice fed to the cutter in a chute in any suitable manner.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. An ice milling machine comprising a chute with an open side for receiving a cake of ice, a slide for closing said side to hold a cake of ice in said chute, a disc cutter coaxial with said chute and transversely across the bottom thereof and having radial cutting elements starting at the center, means for rotating said disc cutter, and means for holding a cake of ice from moving downwards in said chute, comprising a lever pivotally mounted and supporting a pin adapted to engage through an opening in the side of the chute and abut the cake of ice disposed within said chute to force the cake of ice against the opposed side of the chute.

2. An ice milling machine comprising a chute with an open side for receiving a cake of ice, a slide for closing said side to hold a cake of ice in said chute, a disc cutter coaxial with said chute and transversely across the bottom thereof and having radial cutting elements starting at the center, means for rotating said disc cutter, and means for holding a cake of ice from moving downwards in said chute, comprising a lever pivotally mounted and supporting a pin adapted to engage through an opening in the side of the chute and abut the cake of ice disposed within said chute to force the cake of ice against the opposed side of the chute, the other end of said lever being provided with a handle.

3. An ice milling machine comprising a chute with an open side for receiving a cake of ice, a disc cutter coaxial with said chute and transversely across the bottom thereof and having radial cutting elements starting at the center, means for rotating said disc cutter, said disc cutter comprising a disc with radial openings and adjacent radial grooves on the upper face of the disc forming flange portions along one side of each radial opening, said cutting elements being disposed within said radial openings and horizontally adjustably secured upon the flange portions by bolts engaging through said flanges and through horizontal slots in said cutting elements and nuts engaging the free ends of the bolts, said nuts being located totally within said radial grooves, teeth upon the inner ends of said cutting elements adapted to act as drills when said elements are adjusted and cut-away the center of said ice cake thereby greatly increasing the milling speed.

4. An ice milling machine comprising a disc cutter for shaving ice, a chute adapted to receive a cake of ice and direct it against said cutter, said cutter being adapted to operate continuously, pin means extending through a wall of said chute, abutment means opposite said pin means, a handle exteriorly of said chute connected to said pin means, said handle being movably mounted on said chute to engage intermittently said pin means with said cake, said pin means and said abutment means preventing said cake from sliding into contact with said cutter.

5. A rotary cutting disc for an ice milling machine comprising a flat circular disc, radially extending openings in said disc, grooves in said disc adjacent said openings so as to form flanges therebetween, cutting blades supported on the opening sides of said flanges and being secured thereto by means of bolts and nuts, said bolts and nuts being countersunk in said grooves, and enlarged horizontally extending apertures in said blades through which said bolts extend whereby said blades may be adjusted, the center of said disc being imperforate and the end edges of said blades being cut away at an angle, the cutting edges of said blades contacting each other above said imperforate center.

PASQUALE COSCIA.